(12) United States Patent
Kim

(10) Patent No.: US 9,166,260 B2
(45) Date of Patent: Oct. 20, 2015

(54) BATTERY MODULE

(71) Applicants: SAMSUNG SDI CO., LTD., Yongin-si, Gyeonggi-do (KR); ROBERT BOSCH GMBH, Stuttgart (DE)

(72) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 108 days.

(21) Appl. No.: 13/801,831

(22) Filed: Mar. 13, 2013

(65) Prior Publication Data

US 2013/0288099 A1  Oct. 31, 2013

Related U.S. Application Data

(60) Provisional application No. 61/638,298, filed on Apr. 25, 2012.

(51) Int. Cl.
| | |
|---|---|
| *H01M 2/00* | (2006.01) |
| *H01M 10/6568* | (2014.01) |
| *H01M 2/10* | (2006.01) |
| *H01M 2/12* | (2006.01) |
| *H01M 10/625* | (2014.01) |
| *H01M 10/647* | (2014.01) |
| *H01M 10/6557* | (2014.01) |
| *H01M 10/613* | (2014.01) |
| *H01M 10/04* | (2006.01) |

(52) U.S. Cl.
CPC ........ *H01M 10/5077* (2013.01); *H01M 2/1016* (2013.01); *H01M 2/1077* (2013.01); *H01M 2/12* (2013.01); *H01M 10/613* (2015.04); *H01M 10/625* (2015.04); *H01M 10/647* (2015.04); *H01M 10/6557* (2015.04); *H01M 10/6568* (2015.04); *H01M 10/0481* (2013.01)

(58) Field of Classification Search
CPC ......... H01M 2/00; H01M 6/00; H01M 10/00; H01M 2002/00; H01M 10/0481; H01M 10/5077; H01M 10/613; H01M 10/625; H01M 10/647; H01M 10/6557; H01M 10/6568; H01M 2/1016; H01M 2/1077; H01M 2/12
USPC ............... 429/88, 96, 99, 100, 129, 130, 135, 429/138, 148, 149, 151, 152, 154, 163
See application file for complete search history.

(56) References Cited

U.S. PATENT DOCUMENTS

2009/0061299 A1*  3/2009  Uchida et al. ................. 429/156

FOREIGN PATENT DOCUMENTS

| | | |
|---|---|---|
| EP | 1 852 924 A1 | 11/2007 |
| EP | 2 031 672 A1 | 3/2009 |
| JP | 2008-16259 | 1/2008 |

(Continued)

OTHER PUBLICATIONS

Extended European Search Report dated Aug. 5, 2013 for related EP Application No. 13163675.5 (7sheets).

*Primary Examiner* — Patrick Ryan
*Assistant Examiner* — Ben Lewis
(74) *Attorney, Agent, or Firm* — Christie, Parker & Hale, LLP

(57) ABSTRACT

A battery module including a plurality of battery cells; and a barrier including a body portion, and a partition wall protruding from a first side of the body portion, first adjacent battery cells of the plurality of battery cells being arranged at the first side of the body portion, the partition wall extending between the first adjacent battery cells.

19 Claims, 5 Drawing Sheets

(56) References Cited

FOREIGN PATENT DOCUMENTS

| KR | 10-2006-0063175 | 6/2006 |
| KR | 10-2006-0099216 | 9/2006 |
| WO | WO 2012/151190 A2 | 11/2012 |

* cited by examiner

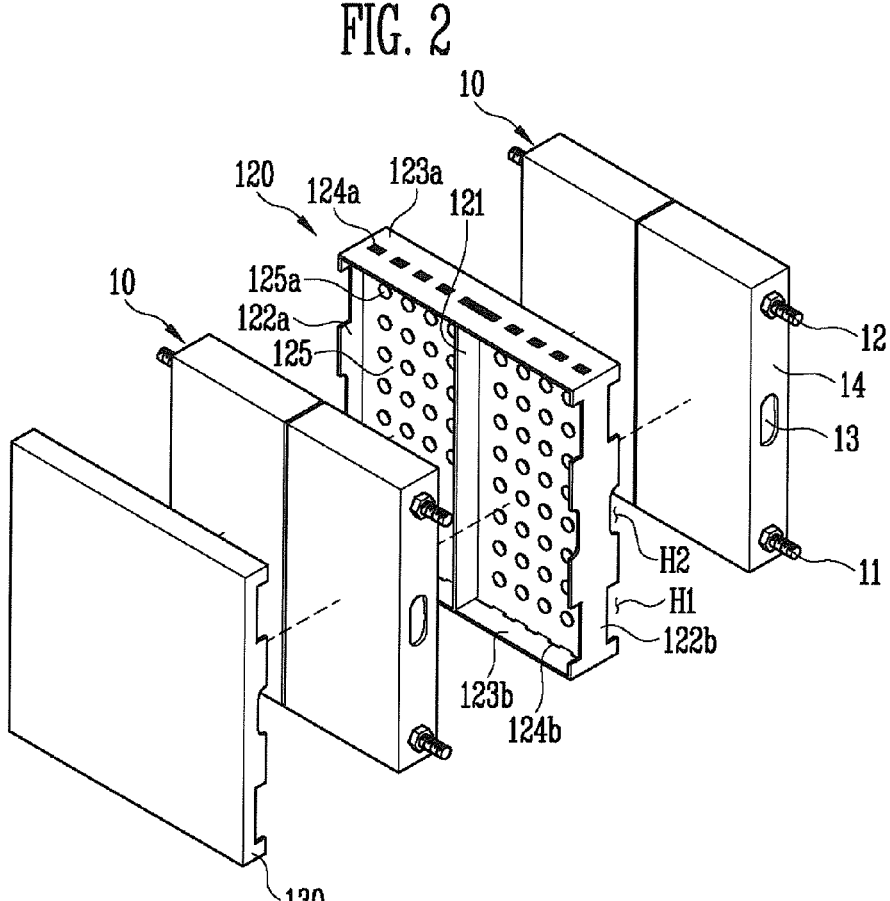
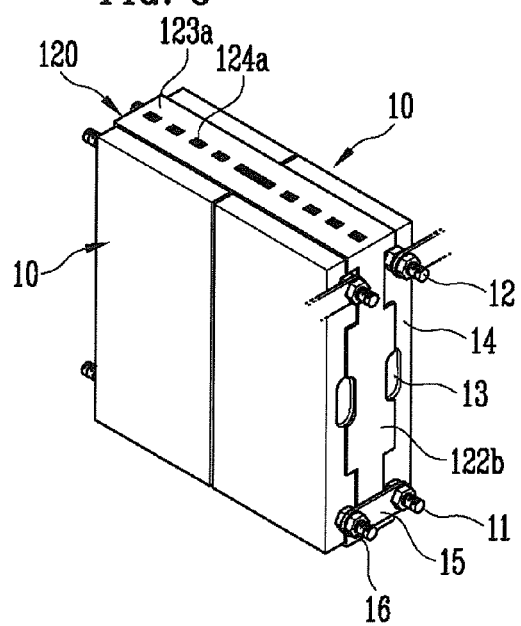

BATTERY MODULE

CROSS-REFERENCE TO RELATED APPLICATION

This application claims priority to and the benefit of U.S. Provisional Application No. 61/638,298, filed on Apr. 25, 2012 in the United States Patent and Trademark Office, the entire content of which is incorporated herein by reference.

BACKGROUND

1. Field

Aspects of embodiments of the present invention relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series to be useable in driving motors of devices requiring high power, such as electric vehicles, hybrid vehicles, and the like.

The battery module may include a plurality of battery cells. However, the plurality of battery cells are typically not efficiently arranged in a space, and an unnecessarily wide interval between the battery cells exists, and, therefore, the accommodation efficiency of the battery cells is decreased.

SUMMARY

According to an aspect of embodiments of the present invention, a battery module includes a barrier having a novel structure.

According to another aspect of embodiments of the present invention, a battery module has an improved accommodation efficiency of battery cells. As such, a rechargeable battery according to embodiments of the present invention is suited for application in an electric vehicle or a hybrid electric vehicle.

According to an embodiment of the present invention, a battery module includes: a plurality of battery cells; and a barrier including a body portion, and a partition wall protruding from a first side of the body portion, first adjacent battery cells of the plurality of battery cells being arranged at the first side of the body portion, the partition wall extending between the first adjacent battery cells.

Second adjacent battery cells of the plurality of battery cells may be arranged at a second side of the body portion opposite the first side.

The barrier may further include at least one flange portion extending at a periphery of the body portion and at least partially covering outer sides of each of the first adjacent battery cells and the second adjacent battery cells.

The at least one flange portion may have at least one opening formed therein and defining a heat transfer medium flow path therethrough.

In one embodiment, the barrier further includes a plurality of protrusions protruding from at least one of the first side or the second side of the body portion, and protrusions of the plurality of protrusions are spaced from one another at an interval, the heat transfer medium flow path passing between the protrusions.

In one embodiment, the at least one flange portion includes a first flange portion at a first side of the periphery, and a second flange portion at a second side of the periphery opposite the first side of the periphery, the at least one first opening includes a plurality of first openings spaced from one another at locations of the first flange portion substantially corresponding to the interval, and the at least one second opening includes a plurality of second openings spaced from one another at locations of the second flange portion substantially corresponding to the interval.

The partition wall may have at least one another opening formed therein and further defining the heat transfer medium flow path therethrough.

Each of the first adjacent battery cells may include a terminal portion and a vent portion, and the at least one flange portion may have terminal holes and vent holes formed therein at locations corresponding to the terminal portions and the vent portions, respectively.

The terminal portion and the vent portion of one of the first adjacent battery cells may face in the same or opposite direction as the terminal portion and the vent portion of another one of the first adjacent battery cells.

The battery module may further include: a housing fastening the plurality of battery cells together, the housing including a pair of end plates at opposite ends of the plurality of battery cells, and at least one bracket connecting the end plates to each other; and an end barrier between the barrier and an end plate of the pair of end plates.

According to another embodiment of the present invention, a battery module includes: a plurality of battery cells electrically connected to one another and spaced in a first direction; and a barrier including a body portion between adjacent battery cells of the plurality of battery cells, and a first flange portion protruding from the body portion in the first direction and at least partially covering a first side of a first battery cell of the adjacent battery cells, the first flange portion having at least one first opening formed therein and defining a heat transfer medium flow path therethrough, the heat transfer medium flow path being located between the body portion and the first battery cell.

The barrier may further include a second flange portion protruding from the body portion in the first direction and at least partially covering a second side of the first battery cell opposite the first side, the second flange portion being spaced from the first flange portion in a second direction substantially perpendicular to the first direction, the second flange portion having at least one second opening formed therein and further defining the heat transfer medium flow path therethrough.

In one embodiment, the barrier further includes a plurality of protrusions protruding from a side of the body portion in the first direction and contacting a surface of the first battery cell facing in a direction opposite the first direction, and the heat transfer medium flow path is located between the side of the body portion and the surface of the first battery cell.

Protrusions of the plurality of protrusions may be spaced from one another at an interval, and the heat transfer medium flow path may pass between the protrusions.

The at least one first opening may include a plurality of first openings spaced from one another at locations of the first flange portion substantially corresponding to the interval, and the at least one second opening may include a plurality of second openings spaced from one another at locations of the second flange portion substantially corresponding to the interval.

The heat transfer medium flow path may contact the surface of the first battery cell.

In one embodiment, the first flange portion includes a portion extending from the body portion in a direction opposite the first direction and at least partially covering a side of a second battery cell of the adjacent battery cells, and the portion of the first flange portion has at least one opening formed therein, the at least one opening defining another heat transfer medium flow path passing therethrough, the another heat transfer medium flow path being located between the body portion and the second battery cell.

The battery module may further include another battery cell spaced from the first battery cell in a third direction substantially perpendicular to the first direction, the barrier further including a partition wall protruding from the body portion in the first direction and being located between the first battery cell and the another battery cell.

The partition wall may have at least one opening formed therein and further defining the heat transfer medium flow path therethrough.

According to another embodiment of the present invention, a battery module includes: a barrier including a partition wall formed to accommodate at least two battery cells; and the at least two battery cells accommodated by the partition wall, and each having a cap plate provided with terminal portions and a vent portion through which gas is exhausted.

The barrier may further include a barrier main body facing a long side surface of the battery cell, and flange portions formed to surround the outline of the barrier main body and accommodating the battery cell together with the partition wall.

The barrier may accommodate the battery cells in both directions of the barrier main body.

The barrier may accommodate the battery cells in one direction of the barrier main body.

The flange portion may include first and second flange portions covering the respective cap plates of neighboring battery cells, and third and fourth flange portions provided between the first and second flange portions so as to cover at least one side surface of each of the battery cells.

Terminal holes corresponding to the respective terminal portions and a vent hole corresponding to the vent portion may be formed in each of the first and second flange portions.

The flange portion may include a first flange portion covering a plurality of neighboring cap plates, a second flange portion positioned to face the first flange portion, and third and fourth flange portions provided between the first and second flange portions so as to cover at least one side surface of each of the battery cells.

Terminal holes corresponding to the respective terminal portions and a vent hole corresponding to the vent portion may be formed in each of the third and fourth flange portions.

The barrier may further include a plurality of protruding portions provided on the barrier main body and allowing the battery cell and the barrier to be spaced apart at an interval (e.g., a predetermined interval).

The plurality of protruding portions may be arranged such that adjacent protruding portions are spaced apart at an interval (e.g., a predetermined interval).

First and second refrigerant holes may be formed in the third and fourth flange portions, respectively.

The first and second refrigerant holes may be formed to correspond to the interval (e.g., a predetermined interval) between the adjacent protruding portions so as to form a flow path of a refrigerant for cooling the battery cells.

Bottom surfaces respectively facing the side surfaces on which the terminal portions are formed among the short side surfaces of the neighboring battery cells may be disposed opposite to each other by the medium of the partition wall.

Short side surfaces provided between bottom surfaces and side surfaces on which the terminal portions are formed among the short side surfaces of the neighboring battery cells may be disposed opposite to each other by the medium of the partition wall.

The battery module may further include a housing accommodating the battery cells and the barriers.

The housing may include a pair of end plates accommodating the battery cells and provided to be spaced apart from each other in one direction, and side brackets connecting the pair of end plates to each other.

According to an aspect of embodiments of the present invention, a battery module includes a barrier having a structure in which a novel partition wall is formed.

Further, according to another aspect of embodiments of the present invention, a battery module has reduced production cost and improved process efficiency.

BRIEF DESCRIPTION OF THE DRAWINGS

The accompanying drawings, together with the specification, illustrate some exemplary embodiments of the present invention, and, together with the description, serve to explain aspects and principles of the present invention.

FIG. 2 is a partial exploded perspective view of the battery module of FIG. 1.

FIG. 3 is a perspective view of a portion of the battery module of FIG. 1.

DETAILED DESCRIPTION

Figure 1:
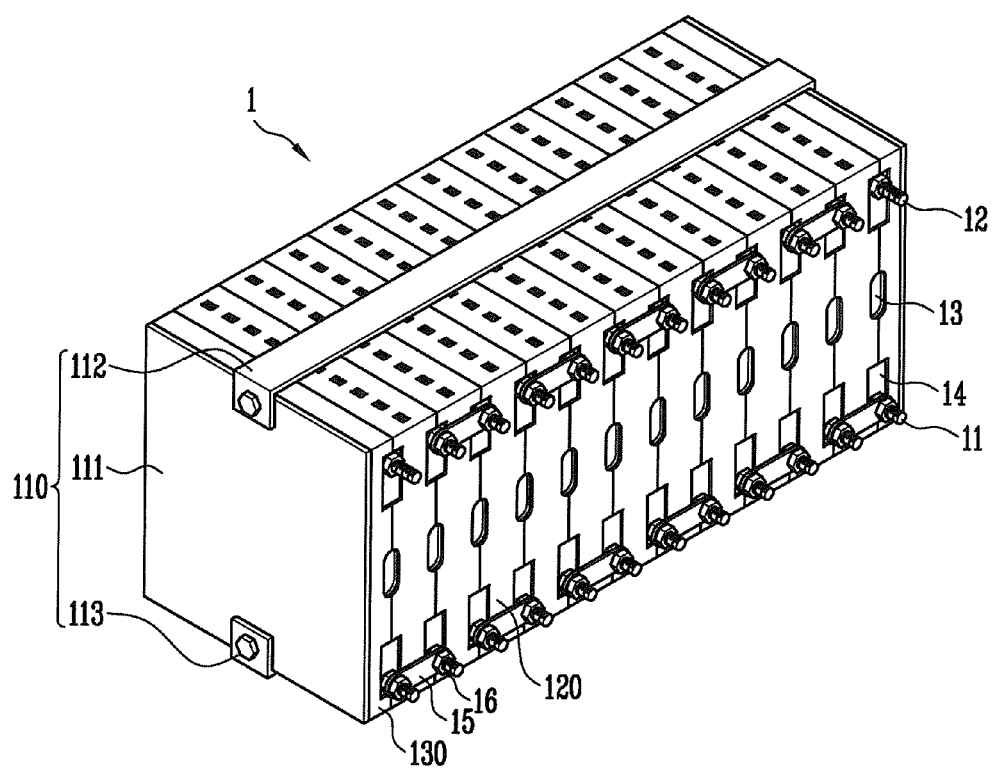
FIG. 1 is a perspective view of a battery module according to an embodiment of the present invention.

In the following detailed description, some exemplary embodiments of the present invention are shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. In addition, when an element is referred to as being "on" another element, it may be directly on the another element or indirectly on the another element with one or more intervening elements interposed therebetween. Also, when an element is referred to as being "connected to" another element, it may be directly connected to the another element or indirectly connected to the another element with one or more intervening elements interposed therebetween. Hereinafter, like reference numerals refer to like elements.

A battery module according to an embodiment of the present invention is described below with reference to FIGS. 1 to 4.

Figure 4:
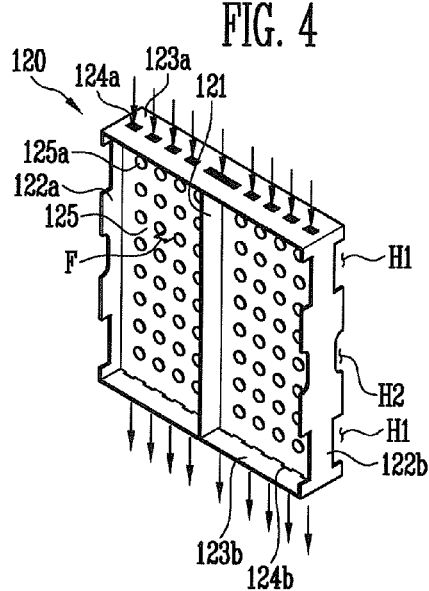
FIG. 4 is a perspective view of a barrier of the battery module of FIG. 1, according to an embodiment of the present invention.

FIG. 1 is a perspective view of a battery module according to an embodiment of the present invention. FIG. 2 is a partial exploded perspective view of the battery module of FIG. 1. FIG. 3 is a perspective view of a portion of the battery module of FIG. 1. FIG. 4 is a perspective view of a barrier of the battery module of FIG. 1, according to an embodiment of the present invention.

Referring to FIGS. 1 and 2, a battery module 1 according to an embodiment of the present invention includes: a barrier 120 having a partition wall 121 formed to accommodate at least two battery cells 10; and the at least two battery cells 10 accommodated by the partition wall 121, each of the battery cells 10 having a cap plate 14, terminal portions 11 and 12, and a vent portion 13 through which gas may be exhausted.

The barrier 120, in one embodiment, has a barrier main body 125 facing a long side surface of the battery cell 10, and first to fourth flange portions 122a, 122b, 123a and 123b formed to surround a perimeter of the barrier main body 125 and accommodating the battery cell 10 together with the partition wall 121.

The first and second flange portions 122a and 122b cover the respective cap plates 14 of neighboring battery cells 10 accommodated by the barrier 120. The third and fourth flange portions 123a and 123b are provided between the first and second flange portions 122a and 122b so as to cover at least one side surface of each of the neighboring battery cells 10.

In one embodiment, terminal holes H1 corresponding to the respective terminal portions 11 and 12 and a vent hole H2 corresponding to the vent portion 13 are formed in each of the first and second flange portions 122a and 122b.

In one embodiment, a plurality of protruding portions 125a are further provided to the barrier 120. The plurality of protruding portions 125a are provided on the barrier main body 125 and allow the battery cell 10 and the barrier 120 to be spaced apart by a distance. The plurality of protruding portions 125a, in one embodiment, are arranged such that adjacent protruding portions 125a are spaced apart at an interval "F" (e.g., a predetermined interval) (see FIG. 4).

The barriers 120 positioned at a central region of the battery module 1 may accommodate battery cells 10 in both directions of the barrier main body 125, whereas each of both barriers 130 respectively positioned at opposite ends of the battery module 1 may accommodate the battery cell 10 in one direction of the barrier main body 125.

Referring to FIGS. 2 to 4, first and second refrigerant holes 124a and 124b are formed in the third and fourth flange portions 123a and 123b, respectively. The first and second refrigerant holes 124a and 124b, in one embodiment, are spaced apart to correspond to the interval "F" formed between the adjacent protruding portions 125a. The first and second refrigerant holes 124a and 124b define a flow path (depicted by arrows in FIG. 4) of a heat transfer medium, such as a refrigerant for cooling the battery cells 10.

As charging/discharging of the battery cell 10 is performed, gas may be produced by electrode plates and residual products of an electrolyte. The gas may be exhausted through the vent portion 13.

The battery cell 10, in one embodiment, includes a battery case having an opening region and the cap plate 14 sealing the opening region. The battery case accommodates an electrode assembly and the electrolyte. The electrode assembly includes a positive electrode plate, a negative electrode plate, and a separator interposed between the positive and negative electrode plates. In one embodiment, the first and second terminal portions 11 and 12 connected to the positive and negative electrode plates are provided at both ends of the cap plate 14, respectively, and are protruded to the outside of the cap plate 14. The positive and negative electrode plates constituting the electrode assembly generate electrochemical energy by reacting with the electrolyte, and the electrochemical energy is transferred to the outside through the first and second terminal portions 11 and 12.

When the pressure of the gas generated in the battery cell 10 is greater than or equal to a certain pressure (e.g., a predetermined pressure), the vent portion 13 provided between the first and second terminal portions 11 and 12 of the cap plate 14 may serve as a path along which the gas is exhausted from the battery cell 10. Thus, the vent portion 13 may prevent or substantially prevent the battery cell 10 from being damaged by an external pressure of the battery cell 10.

In the battery module 1, bottom surfaces respectively facing the side surfaces on which the terminal portions 11 and 12 are formed among the short side surfaces of the neighboring battery cells 10 are disposed opposite to each other by the medium of the partition wall 121. That is, a plurality of the battery cells 10 are accommodated with the partition wall 121 of one barrier 120 interposed therebetween. In one embodiment, the bottom surfaces of the battery cells 10 are arranged in parallel to face each other. Accordingly, an unnecessary interval between the battery cells 10 is minimized or reduced, thereby efficiently accommodating the battery cells 10 in a narrow space.

The vent portions 13 are provided at central portions of the battery cells 10, respectively. The vent portions 13 are arranged along a straight or approximately straight line along the arranged battery cells 10. The first and second terminal portions 11 and 12 of the neighboring battery cells 10 may be electrically connected through a bus bar 15 formed of a metal, and the bus bar 15 may be fixed to the first and second terminal portions 11 and 12 using a member such as a nut 16.

The battery module 1 may further include a housing 110 accommodating the battery cells 10 and the barriers 120. The housing 110 may include a pair of end plates 111 accommodating the battery cells 10 and provided to be spaced apart from each other in one direction at opposite ends of the plurality of battery cells 10, and side brackets 112 and 113 connecting the pair of end plates 111 to each other.

The pair of end plates 111 are respectively provided to come in surface contact with the outermost battery cells 10 so as to press the plurality of the battery cells 10 toward a central region of the plurality of battery cells 10. The side brackets 112 and 113 are connected to opposite ends of the pair of end plates 111 so as to support both side surfaces of the battery cells 10.

A battery module according to another embodiment of the present invention is described below with reference to FIGS. 5 to 8.

Figure 5:
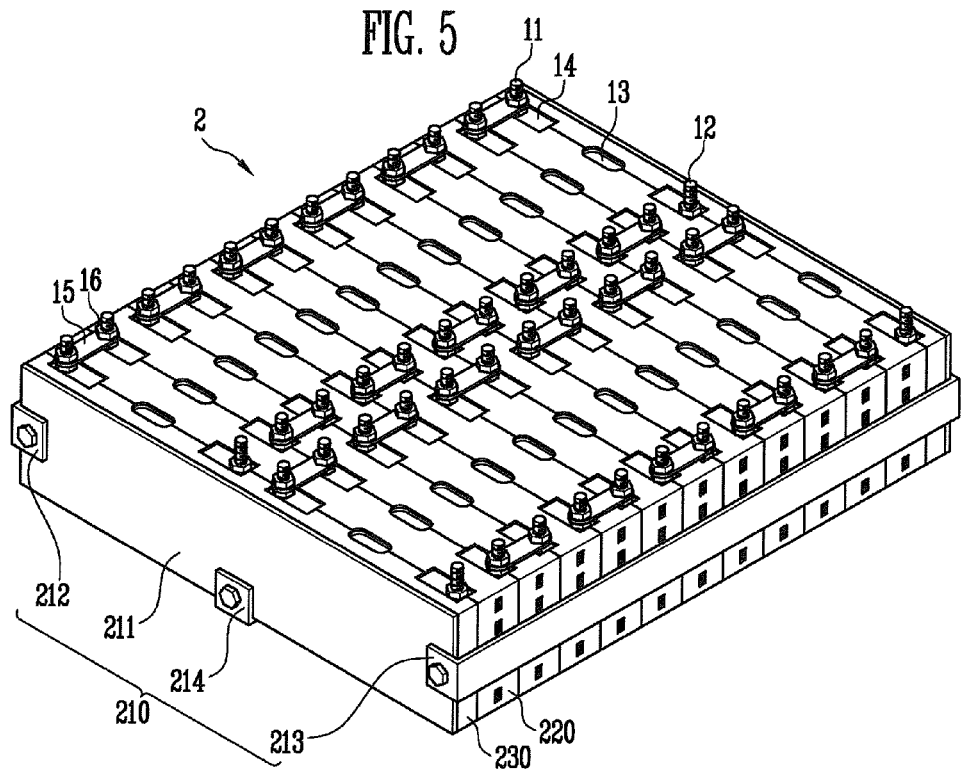
FIG. 5 is a perspective view of a battery module according to another embodiment of the present invention.
Figure 6:
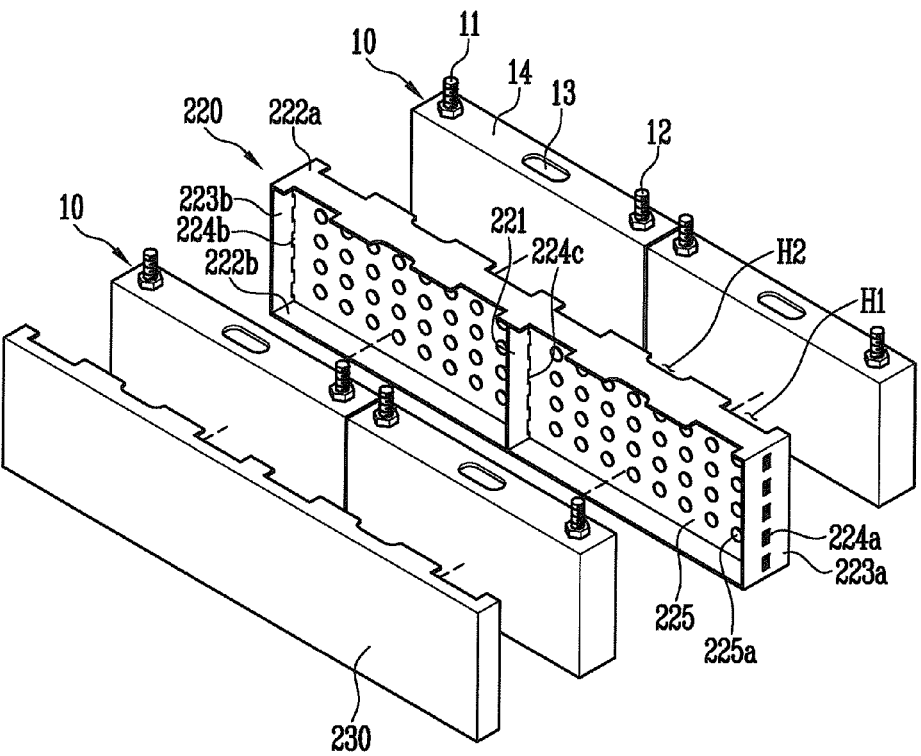
FIG. 6 is a partial exploded perspective view of the battery module of FIG. 5.
Figure 7:
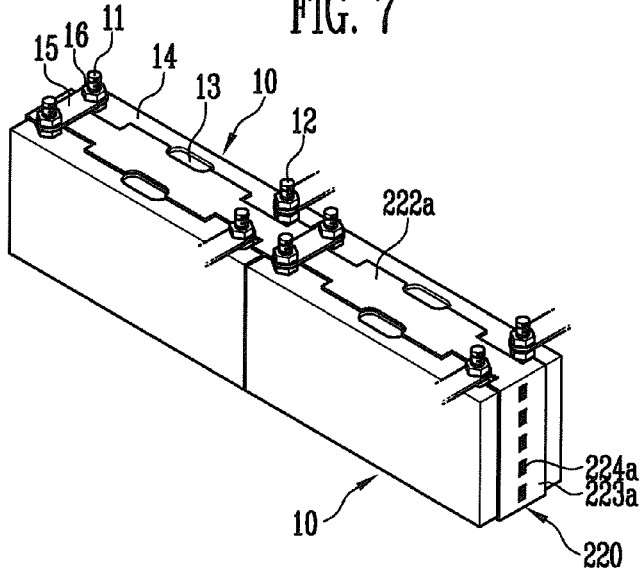
FIG. 7 is a perspective view of a portion of the battery module of FIG. 5.
Figure 8:
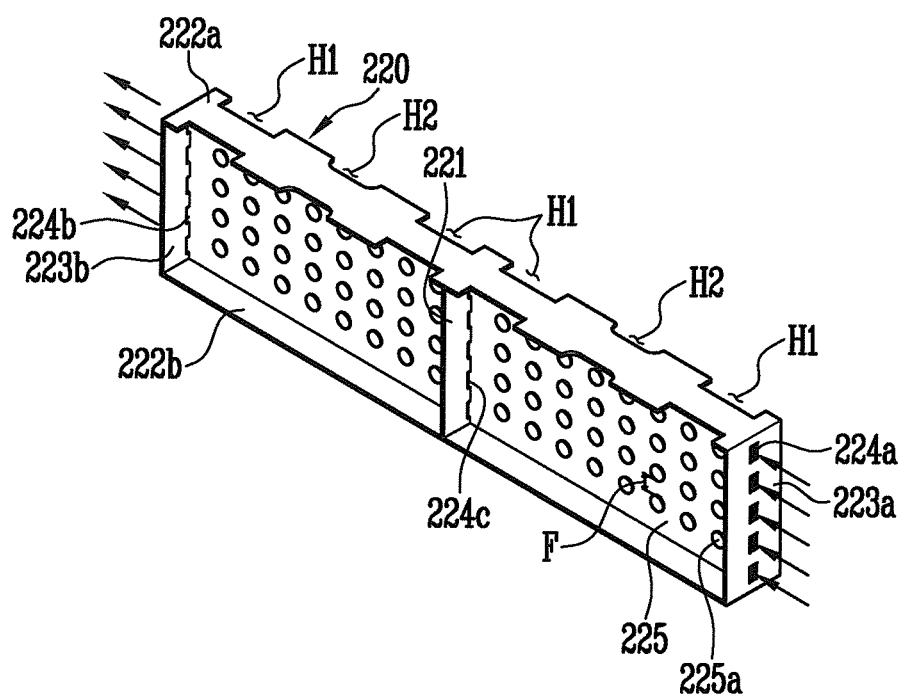
FIG. 8 is a perspective view of a barrier of the battery module of FIG. 5, according to an embodiment of the present invention.

FIG. 5 is a perspective view of a battery module according to another embodiment of the present invention. FIG. 6 is a partial exploded perspective view of the battery module of FIG. 5. FIG. 7 is a perspective view of a portion of the battery module of FIG. 5. FIG. 8 is a perspective view of a barrier of the battery module of FIG. 5, according to an embodiment of the present invention.

Referring to FIGS. 5 and 6, a battery module 2 according to another embodiment of the present invention includes a barrier 220 having a partition wall 221 formed to accommodate at least two battery cells 10; and the at least two battery cells 10 accommodated by the partition wall 221, and each having a cap plate 14 provided with terminal portions 11 and 12 and a vent portion 13 through which gas is exhausted.

The barrier 220, in one embodiment, further has a barrier main body 225 facing a long side surface of the battery cell 10, and first to fourth flange portions 222a, 222b, 223a and 223b formed to surround the outline of the barrier main body 225 and accommodating the battery cell 10 together with the partition wall 221.

The first flange portion 222a covers a plurality of neighboring cap plates, and the second flange portion 222b is positioned to face the first flange portion 222a. The third and fourth flange portions 223a and 223b are provided between the first and second flange portions 222a and 222b so as to cover at least one side surface of each of the battery cells 10.

In one embodiment, terminal holes H1 corresponding to the respective terminal portions 11 and 12 and a vent hole H2 corresponding to the vent portion are formed in each of the third and fourth flange portions 223a and 223b.

In one embodiment, a plurality of protruding portions 225a are further provided to the barrier 220. The plurality of protruding portions 225a are provided on the barrier main body 225 and allow the battery cell 10 and the barrier 220 to be spaced apart by a distance. The plurality of protruding portions 225a, in one embodiment, are arranged such that adjacent protruding portions 225a are spaced apart at an interval "F" (e.g., a predetermined interval) (see FIG. 8).

In one embodiment, the barriers 220 positioned at a central region of the battery module 2 may accommodate battery cells 10 in both directions of the barrier main body 225, whereas each of both barriers 230 respectively positioned at opposite ends of the battery module 2 may accommodate the battery cell 10 in one direction of the barrier main body 225.

Referring to FIGS. 6 to 8, first and second refrigerant holes 224a and 224b are formed in the third and fourth flange portions 223a and 223b, respectively. In one embodiment, the first and second refrigerant holes 224a and 224b are spaced apart to correspond to the interval "F" between the adjacent protruding portions 225a. The first and second refrigerant holes 224a and 224b define a flow path (depicted by arrows in FIG. 8) of a heat transfer medium, such as a refrigerant for cooling the battery cells 10.

Further, the partition wall 221 has third refrigerant holes 224c formed therein and further defining the flow path of the heat transfer medium. The third refrigerant holes 224c may be spaced apart by the interval "F" (e.g., a predetermined interval).

As charging/discharging of the battery cell 10 is performed, gas may be produced by electrode plates and residual products of an electrolyte. The gas may be exhausted through the vent portion 13.

The battery cell 10, in one embodiment, may include a battery case having an opening region and the cap plate 14 sealing the opening region. The battery case accommodates an electrode assembly and the electrolyte. The electrode assembly includes a positive electrode plate, a negative electrode plate, and a separator interposed between the positive and negative electrode plates. The first and second terminal portions 11 and 12 connected to the positive and negative electrode plates may be provided at both ends of the cap plate 14, respectively, and protruded to the outside of the cap plate 14. The positive and negative electrode plates of the electrode assembly generate electrochemical energy by reacting with the electrolyte, and the electrochemical energy is transferred to the outside through the first and second terminal portions 11 and 12.

When the pressure of the gas generated in the battery cell 10 is greater than or equal to a certain pressure (e.g., a predetermined pressure), the vent portion 13 provided between the first and second terminal portions 11 and 12 of the cap plate 14 may serve as a path along which the gas is exhausted from the battery cell 10. Thus, the vent portion 13 may prevent or substantially prevent the battery cell 10 from being damaged by an external pressure of the battery cell 10.

In the battery module 2, short side surfaces provided between bottom surfaces and side surfaces on which the terminal portions 11 and 12 are formed among the short side surfaces of the neighboring battery cells 10 are disposed opposite to each other by the medium of the partition wall 221. That is, a plurality of the battery cells 10 are accommodated with the partition wall 221 of one barrier 220 interposed therebetween. In this case, the side surfaces of the battery cells 10 are arranged in parallel to face each other. Accordingly, an unnecessary interval between the battery cells 10 can be minimized or reduced to efficiently accommodate the battery cells 10 in a narrow space.

The vent portions 13, in one embodiment, are provided at central portions of the battery cells 10, respectively. The vent portions 13 may be arranged along a straight or approximately straight line along the arranged battery cells 10. The first and second terminal portions 11 and 12 of the neighboring battery cells 10 may be electrically connected through a bus bar 15 formed of a metal, and the bus bar 15 may be fixed to the first and second terminal portions 11 and 12 using a member such as a nut 16.

The battery module 2 may further include a housing 210 accommodating the battery cells 10 and the barriers 220. The housing 210 may include a pair of end plates 211 accommodating the battery cells 10 and provided to be spaced apart from each other in one direction, and side brackets 212 and 213 and a bottom bracket 214, which connect the pair of end plates 211 to each other.

The pair of end plates 211 are respectively provided to be in surface contact with the outermost battery cells 10 so as to press the plurality of the battery cells 10 toward a central region of the plurality of battery cells 10. The side brackets 212 and 213 are connected to opposite ends of the pair of end plates 211 so as to support both side surfaces of the battery cells 10. The bottom bracket 214 supports bottom surfaces of the battery cells 10.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of battery cells, each comprising a pair of opposing long side surfaces, a cap plate connected between the opposing long side surfaces, and a terminal portion at the cap plate; and
   a barrier comprising:
      a body portion; and
      a partition wall protruding in a first direction from a surface of the body portion at a first side of the body portion,
   wherein first adjacent battery cells of the plurality of battery cells are arranged at the first side of the body portion and a respective one of the long side surfaces of each of the first adjacent battery cells faces toward the surface of the body portion in a second direction opposite the first direction, the partition wall extending between the first adjacent battery cells.

2. The battery module of claim 1, wherein second adjacent battery cells of the plurality of battery cells are arranged at a second side of the body portion opposite the first side.

3. The battery module of claim 2, wherein the barrier further comprises at least one flange portion extending at a periphery of the body portion and at least partially covering outer sides of each of the first adjacent battery cells and the second adjacent battery cells.

4. The battery module of claim 3, wherein the at least one flange portion has at least one opening formed therein and defining a heat transfer medium flow path therethrough.

5. The battery module of claim 4,
wherein the barrier further comprises a plurality of protrusions protruding from at least one of the first side or the second side of the body portion, and
wherein protrusions of the plurality of protrusions are spaced from one another at an interval, the heat transfer medium flow path passing between the protrusions.

6. The battery module of claim 5,
wherein the at least one flange portion includes a first flange portion at a first side of the periphery, and a second flange portion at a second side of the periphery opposite the first side of the periphery,
wherein the at least, one first opening includes a plurality of first openings spaced from one another at locations of the first flange portion substantially corresponding to the interval, and
wherein the at least one second opening includes a plurality of second openings spaced from one another at locations of the second flange portion substantially corresponding to the interval.

7. The battery module of claim 4, wherein the partition wall has at least one another opening formed therein and further defining the heat transfer medium flow path therethrough.

8. The battery module of claim 1, further comprising:
a housing fastening the plurality of battery cells together, the housing comprising a pair of end plates at opposite ends of the plurality of battery cells, and at least one bracket connecting the end plates to each other; and
an end barrier between the barrier and an end plate of the pair of end plates.

9. A battery module comprising:
a plurality of battery cells; and
a barrier comprising:
a body portion; and
a partition wall protruding from a first side of the body portion,
wherein first adjacent battery cells of the plurality of battery cells are arranged at the first side of the body portion, the partition wall extending between the first adjacent battery cells,
wherein second adjacent battery cells of the plurality of battery cells are arranged at a second side of the body portion opposite the first side,
wherein the barrier further comprises at least one flange portion extending at a periphery of the body portion and at least partially covering outer sides of each of the first adjacent battery cells and the second adjacent battery cells,
wherein each of the first adjacent battery cells comprises a terminal portion and a vent portion, and
wherein the at least one flange portion has terminal holes and vent holes formed therein at locations corresponding to the terminal portions and the vent portions, respectively.

10. The battery module of claim 9, wherein the terminal portion and the vent portion of one of the first adjacent battery cells face in the same or opposite direction as the terminal portion and the vent portion of another one of the first adjacent battery cells.

11. A battery module comprising:
a plurality of battery cells electrically connected to one at/other and spaced in a first direction; and
a barrier comprising:
a body portion between first sides of adjacent battery cells of the plurality of battery cells, each of the first sides of the adjacent battery cells facing the body portion and facing the first direction or a direction opposite the first direction; and
a first flange portion protruding from the body portion in the first direction and at least partially covering a second side of a first battery cell of the adjacent battery cells,
wherein the first flange portion has at least one first opening formed therein and defining a heat transfer medium flow path therethrough, the heat transfer medium flow path being located between the body portion and the first battery cell.

12. The battery module of claim 11, wherein the barrier further comprises a second flange portion protruding from the body portion in the first direction and at least partially covering a third side of the first battery cell opposite the second side, the second flange portion being spaced from the first flange portion in a second direction substantially perpendicular to the first direction, the second flange portion having at least one second opening formed therein and further defining the heat transfer medium flow path therethrough.

13. The battery module of claim 12,
wherein the barrier further comprises a plurality of protrusions protruding from a side of the body portion in the first direction and contacting a surface of the first battery cell facing in the direction opposite the first direction, and
wherein the heat transfer medium flow path is located between the side of the body portion and the surface of the first battery cell.

14. The battery module of claim 13,
wherein protrusions of the plurality of protrusions are spaced from one another at an interval, and
wherein the heat transfer medium flow path passes between the protrusions.

15. The battery module of claim 14,
wherein the at least one first opening includes a plurality of first openings spaced from one another at locations of the first flange portion substantially corresponding to the interval, and
wherein the at least one second opening includes a plurality of second openings spaced from one another at locations of the second flange portion substantially corresponding to the interval.

16. The battery module of claim 13, wherein the heat transfer medium flow path contacts the surface of the first batter cell.

17. The battery module of claim 11,
wherein the first flange portion comprises a portion extending from the body portion in the direction opposite the first direction and at least partially covering a second side of a second battery cell of the adjacent battery cells,
wherein the portion of the first flange portion has at least one opening formed therein, the at least one opening defining another heat transfer medium flow path passing therethrough, the another heat transfer medium flow path being located between the body portion and the second battery cell.

18. The battery module of claim 11, further comprising another battery cell spaced from the first battery cell in a direction substantially perpendicular to the first direction,
wherein the barrier further comprises a partition wail protruding from the body portion in the first direction and being located between the first battery cell and the another battery cell.

19. The battery module of claim 18, wherein the partition wall has at least one opening formed therein and further defining the heat transfer medium flow path therethrough.

* * * * *